United States Patent [19]

Nakanishi et al.

[11] Patent Number: 5,011,062
[45] Date of Patent: Apr. 30, 1991

[54] ULTRASONIC WELDING MASK

[75] Inventors: Todd G. Nakanishi; Matthew F. Taylor, both of Kokomo, Ind.

[73] Assignee: Delco Electronics Corporation, Kokomo, Ind.

[21] Appl. No.: 520,907

[22] Filed: May 9, 1990

[51] Int. Cl.[5] .................. B23K 20/10; H01L 21/48
[52] U.S. Cl. ................................. 228/1.1; 228/49.1
[58] Field of Search .............. 228/1.1, 214, 110, 111, 228/49.1; 156/580.1, 580.2

[56] References Cited

U.S. PATENT DOCUMENTS

| 4,730,764 | 3/1988 | Hawkins et al. | 228/1.1 |
| 4,757,933 | 7/1988 | Hawkins et al. | 228/110 |
| 4,852,788 | 8/1989 | Patrikios | 228/1.1 |

Primary Examiner—Sam Heinrich
Attorney, Agent, or Firm—Creighton R. Meland

[57] ABSTRACT

A welding mask for ultrasonic welding has a part positioning window that receives a first metallic part that is ultrasonically welded to a second metallic part. The mask is engaged with a top surface of the second part and the first part is then placed in the window with its lower surface engaging an upper surface of the second part. The first part is then engaged by ultrasonic welding apparatus which vibrates it and causes it to be welded to the second part. The internal walls defining the window are comprised of a first portion having parallel surfaces which can contact the edges of the first part. Extending from the first portion to the lower surface of the mask is a slanted or chamfered surface that slants away from the edges of the first part and does not contact the edges of the first part. The purpose of the chamfered surface is to prevent the first part from becoming adhered to the welding mask during ultrasonic welding.

8 Claims, 1 Drawing Sheet

ULTRASONIC WELDING MASK

This invention relates to ultrasonic welding apparatus and more particularly to a welding mask for ultrasonic welding.

Ultrasonic welding has been used to weld metallic parts. In the fabrication of certain electronic parts a copper part, also known as a copper buffer, is ultrasonically welded to an aluminum heat sink or backplate. In this application of ultrasonic welding, a welding mask has been utilized that has a positioning window or bore to properly position the copper buffer relative to the backplate.

During ultrasonic welding, the backplate is placed on an anvil and the mask is moved into contact with an upper surface of the backplate by a movable clamping mechanism. The window in the mask is defined by parallel side surfaces that extend upwardly from the bottom surface of the mask. The copper part is placed in the window with its side edges located adjacent the parallel surfaces of the mask that define the window. The copper part is now vibrated by ultrasonic welding apparatus and as a result, an ultrasonic weld is made between the lower surface of the copper part and an upper surface portion of the aluminum backplate.

In the welding mask that has been described, the entire length or height of the parallel internal surfaces that define the window can engage the side surfaces of the copper part. As the copper part is now vibrated by the ultrasonic welding apparatus, the temperature of the lower surface of the copper part that contacts the backplate increases and the lower portion of the copper part becomes hotter than the upper portion of the copper part. The lower portion of the copper part may be heated to a point where it becomes adhered to certain of the internal mask surfaces defining the window. If this happens, the movement of the mask to retract it away from the backplate upon completion of the weld may cause separation of the interface between the copper part and the aluminum backplate with the result that an unacceptable weld is produced. Thus, if the copper part is adhered to the mask, movement of the mask away from the backplate has a tendency to move the copper part with it and away from the backplate until the adhesive bond between the copper part and mask separates.

It, accordingly, is an object of this invention to provide a new and improved welding mask, for ultrasonic welding, that prevents adherence between positioning surfaces of the mask and a part located within the positioning surfaces during ultrasonic welding of the part. The object is accomplished by providing a window in the mask that is defined by lower internal surfaces that are arranged such that they cannot contact edges of the part to be welded during ultrasonic welding. The lower surfaces that do not contact the part to be welded extend from upper positioning surfaces that can contact the part during ultrasonic welding. More specifically, the lower surfaces take the form of a chamfered surface which is slanted away from the side edges of the part to be welded. The upper surfaces that can contact the side edges of the part to be welded are parallel to each other and normal to the lower surface of the mask. These upper surfaces serve to properly position the part since they confine the part to a certain position. The chamfered surface extends from the bottom of the mask to a point that is about 66 per cent of the height or thickness of the part to be welded. With this arrangement, the part does not become adhered to the chamfered surface during ultrasonic welding of the part and accordingly, when the mask is retracted, it does not tend to pull the part with it.

IN THE DRAWINGS

Figure 1:
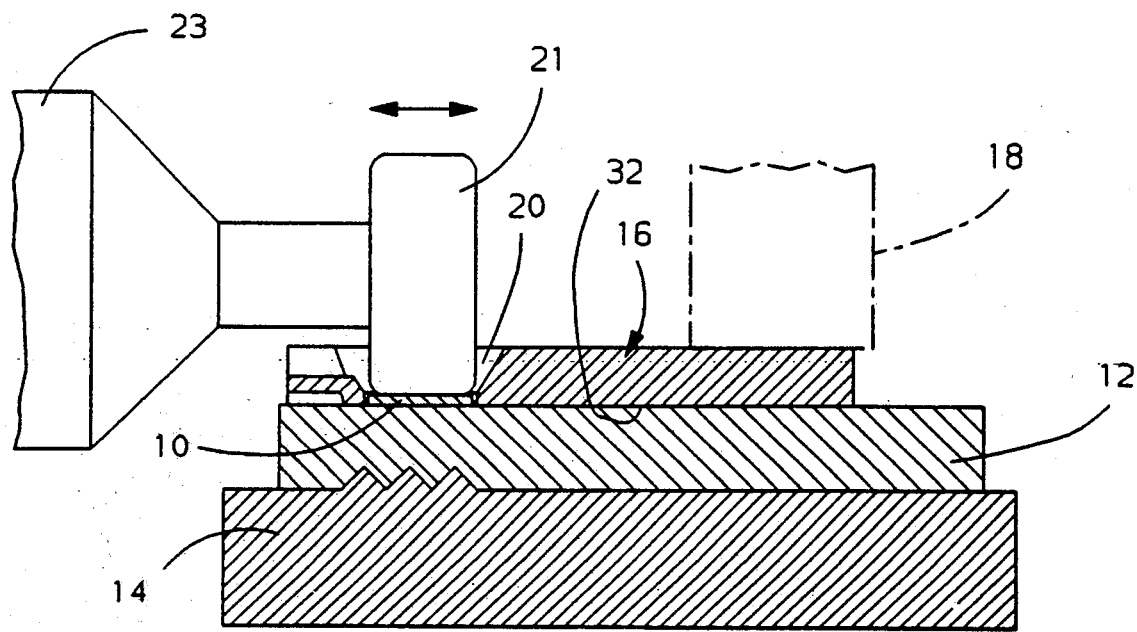
FIG. 1 illustrates ultrasonic welding apparatus utilizing a welding mask made in accordance with this invention.

Referring to the drawings, and more particularly to FIG. 1, apparatus for ultrasonically welding a copper part 10 to an aluminum part 12 is illustrated. The copper part 10 can be a copper buffer of an electronic assembly and the part 12 can be a heat sink or backplate for the assembly.

To make a weld, the part 12 is placed on an anvil 14. A welding mask 16 is then placed on part 12 by a suitable clamping mechanism 18 that carries mask 16 and which positions the mask 16 on the part 12. The mask clamps part 12 between it and the anvil 14. The mask 16 has a bore 20 and after the mask is in place, the copper buffer part 10 is placed in the bore 20 with its lower surface engaging an upper surface portion of aluminum backplate 12. The welding tip 21 of an ultrasonic welding apparatus is now lowered such that the tip engages the top surface of copper buffer part 10.

The ultrasonic welding apparatus is well known to those skilled in the art and comprises the welding tip 21 and a horn 23. The frequency of the ultrasonic welder can be 20 KHZ and when the welder is energized, the tip 21 vibrates back and forth in the direction of the arrows shown in FIG. 1.

The part 10 is vibrated back and forth by the tip 21 to cause the lower surface of part 10 to vibrate relative to part 12 and eventually an ultrasonic weld is produced between the lower surface of part 10 and an upper surface portion of part 12. After the weld is completed, the tip is retracted and the clamping mechanism 18 moves the weld mask 16 away from part 12 to a retracted position. The welded parts are then removed.

The weld mask 16 is shown in detail in FIGS. 2 and 3 and it is described in detail hereinafter. Before proceeding to this detailed description of the weld mask, it is pointed out that the weld mask is arranged to prevent adhesion between the outer edges of copper buffer 10 and certain internal surfaces to be described of the bore 20 in the weld mask 16 during ultrasonic welding of the copper buffer 10 to backplate 12. If adhesion is allowed to occur between the weld mask 16 and part 10, retracting movement of the weld mask 16 away from backplate 12 can cause a separation in the weld interface between the lower surface of part 10 and an upper surface portion of backplate 12. Consequently, a defective weld is produced.

In the following description of the weld mask 16, specific dimensions will be disclosed. These are given by way of example and not by way of limitation.

Figure 2:
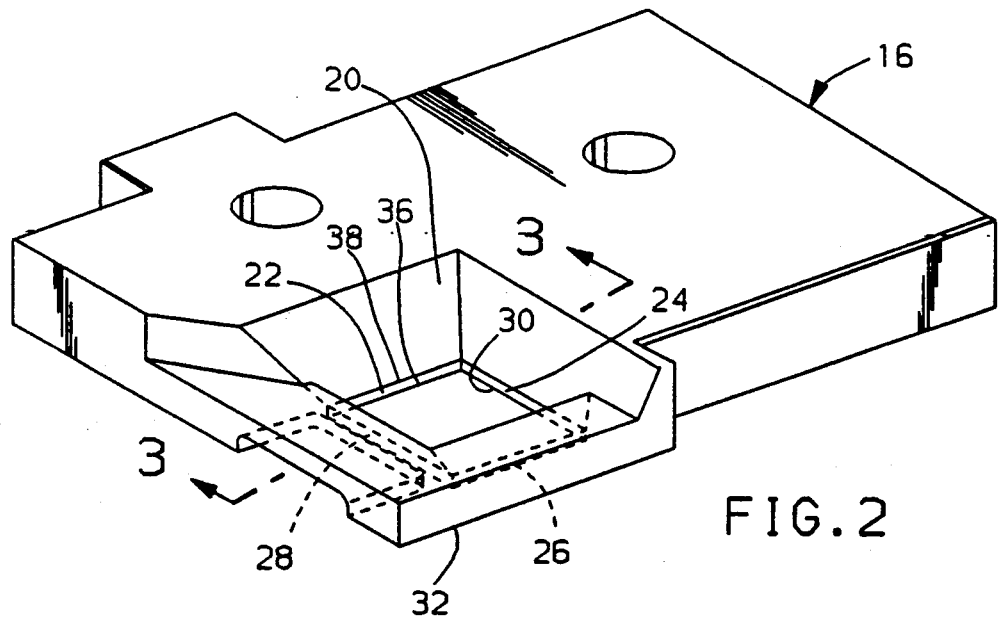
FIG. 2 is a perspective view of a welding mask made in accordance with this invention.
Figure 3:
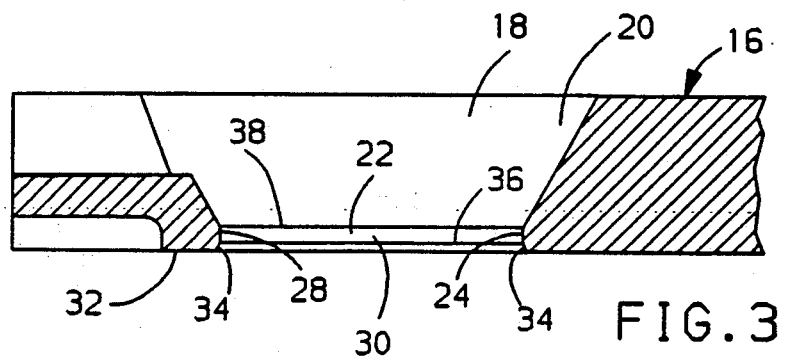
FIG. 3 is a sectional view taken along line 3—3 of FIG. 2.

Referring now to FIGS. 2 and 3, the weld mask 16, which is formed of steel, has a bore or window 20 extending therethrough. More specifically, the bore 20 is defined, in part, by a rectangular flat surface that is defined by flat surface portions 22, 24, 26 and 28. These surfaces define a rectangular positioning window or bore 30 and all of these surfaces are parallel to each other and normal to the lower flat surface 32 of mask 16.

The rectangular surface that is comprised of surfaces 22-28 is joined to four slanted surfaces that together define a slanted surface 34 that is rectangular in outline. Surface 34 is chamfered outwardly at about an angle of 30 degrees to a line normal to surface 32. Putting it another way, there is a chamfered surface that extends from each of the surfaces 22-28. The chamfered surface 34 extends from the lower end 36 of surfaces 22-28 to the lower flat surface 32.

The copper buffer 32 may be about 0.032 inches thick. Assuming this dimension for the copper buffer, the length from surface 32 to the lower end 36 of the surfaces 22-28 can be about 0.021 inches. Further, the length between line 38 (top end of surfaces 22-28) and surface 32 may be about 0.043 inches.

The buffer 10 has a rectangular outline that is defined by side surfaces that are parallel to corresponding surfaces 22-28. The clearance between respective side surfaces of buffer 10 and respective surfaces 22-28 may be about 0.007 inches. This clearance may exceed the amplitude of vibration of tip 22 by about two to four thousandths of an inch.

From the foregoing dimensions, it will be appreciated that when the copper buffer 10 is placed in the window 30 of the weld mask 16 with its lower surface resting on backplate 12 and, accordingly with its lower surface aligned with surface 32, the top surface of buffer 10 will be about 0.011 inches below line 38 and will be about 0.011 inches above line 36. What is important about these dimensions is that the axial length of chamfered surface 34 (0.021 inches) as measured along a line normal to surface 32 is about 66 per cent of the total thickness or height (0.032 inches) of buffer 10. Since chamfered surface 34 cannot contact the outer edges of buffer 10 during ultrasonic welding, the material of buffer 10 will not become adhered to chamfered surface 34. Only about 34 per cent of the of buffer 10 can contact surfaces 22-28. In this regard, during ultrasonic welding, the bottom of buffer 10 that contacts backplate 12 develops a higher temperature than the upper portion of buffer 10. Accordingly, the portion of the buffer that has the higher temperature is located adjacent chamfered portion 34, which cannot contact the buffer. Thus, even if the lower portion of buffer 10 is heated to a point where it could adhere, it will not be adhered to mask 16 due to the provision of chamfered surface 34. This should be contrasted to a welding mask where parallel surfaces, like surfaces 22-28, extend to surface 32 (no chamfer). In such an arrangement, 100 per cent of the thickness or height of the edges of the buffer 10 are contacted by the welding mask internal surfaces with the result that the edges of the buffer may become adhered to the surfaces of the weld mask.

In summary, it will be appreciated that the weld mask of this invention serves to properly position the copper buffer 10 on backplate 12 and it confines movement of buffer 10 within certain limits during ultrasonic welding. This function is provided by surfaces 22-28. Further, by using the chamfered surface 34, the disadvantage of possible adhesion between the copper buffer 10 and weld mask 16 is eliminated.

The embodiments of the invention in which an exclusive property or privilege is claimed are defined as follows:

1. A welding mask for use in the ultrasonic welding of a first metallic part to a second metallic part comprising, a bore extending through said mask for receiving said first part when a lower surface of said mask is engaged with an upper surface of said second part, said bore having a first positioning surface that is complementary to the outer edge configuration of said first part and which can contact the outer edges of said first part when said first part is located inside said positioning surface and during vibration of said first part by ultrasonic welding apparatus, said bore having a second surface that extends from the lower end of said first positioning surface to said lower surface of said mask, said second surface being located outwardly of said positioning surface whereby said second surface does not contact said first part during ultrasonic welding of said first part to said second part.

2. The welding mask according to claim 1 where said second surface is a chamfered surface that slants outwardly from said positioning surface.

3. The welding mask according to claim 1 where the axial length of said second surface as measured from the lower surface of said mask is about 66 per cent of the thickness of said first part.

4. The welding mask according to claim 1 where said second surface is a chamfered surface that slants outwardly from said positioning surface at an angle of about 30 degrees.

5. An apparatus for ultrasonic welding a first metallic part to a second metallic part comprising, an anvil for supporting said second part, a welding mask that is movable to a position where its lower surface engages an upper surface of said second part, said mask having a bore extending therethrough for receiving said first part, said first part when placed in said bore having its lower surface engaging an upper surface area of said second part, an ultrasonic welding tip engageable with an upper surface of said first part to vibrate it and thereby cause it to be welded to said second part, said bore having a first positioning surface that is complementary to the outer edge configuration of said first part and which can contact the outer edges of said first part when it is vibrated by said tip, said bore having a second surface that extends from the lower end of said first positioning surface to said lower surface of said mask, said second surface being located outwardly of said positioning surface whereby said second surface does not contact said first part during vibration of said first part by said tip.

6. The apparatus according to claim 5 where the axial length of said second surface as measured from the lower surface of said mask is about 66 per cent of the thickness of said first part.

7. The apparatus according to claim 5 where said second surface is a chamfered surface that slants outwardly from said positioning surface.

8. The apparatus according to claim 5 where said second surface is a chamfered surface that slants outwardly from said positioning surface at an angle of about 30 degrees.

* * * * *